United States Patent Office 3,308,082
Patented Mar. 7, 1967

3,308,082
FUNGICIDAL AND BACTERICIDAL COMPOSITIONS AND COATING COMPOSITIONS AND PLASTIC MATERIALS CONTAINING THEM
Otto Pauli and Hermann Genth, Krefeld-Bockum, Germany, assignors to Farbenfabriken Bayer Aktiengesellschaft, Leverkusen, Germany, a corporation of Germany
No Drawing. Filed June 26, 1963, Ser. No. 290,577
Claims priority, application Germany, Nov. 27, 1959, F 29,946
6 Claims. (Cl. 260—29.5)

This application is a continuation-in-part of our co-pending application Serial No. 37,550, filed June 10, 1960, now abandoned.

This invention relates to fungicidal and bactericidal compositions and methods of utilizing a mixture of a fungicidal tetraalkylthiuram sulfide and a fungicidal water-insoluble metal salt of pentachlorophenol.

Certain tetraalkylthiuram disulfides and certain water-soluble salts of pentachlorophenol are known to possess some fungicidal and bactericidal activity. For example, it is known to incorporate tetraalkylthiuram disulfides into plastics, coating compositions and textile materials. However, the compositions containing said fungicidal agents are unsatisfactory in many respects, especially because of their short persistency period and the great sensitiveness of said fungicidal agents towards being washed out by water. On the other hand, it is known to incorporate water-soluble salts of pentachlorophenol, for example, sodium-pentachlorophenate, into distemper paints and dispersion paints in order to render them mould-resistant. The said salts are, however, likewise unsatisfactory because of their water solubility.

In adition, the fungicidal and bactericidal activity of the tetraalkylthiuram disulfides and the water-soluble salts of pentachlorophenol respectively, is not high enough to obtain a sufficient preservation of the materials combined therewith without using relatively high amounts of the active agents.

It is an object of the present invention to provide a fungicidal and bactericidal composition the fungicidal and bactericidal activity of which is considerably increased over the fungicidal and bactericidal activity of the above known substances. It is a further object of the present invention to provide a fungicidal and bactericidal composition which is stable against being washed out by water when incorporated into plastic materials or coatings. Another object of the present invention is to provide plastic materials and coating compositions with outstanding fungicidal and bactericidal properties which are stable against being washed out by water and the bactericidal properties considerably increased over the fungicidal and bactericidal properties of corresponding compositions containing tetraalkylthiuram disulfides or water-soluble salts of pentachlorophenol alone.

These and other objects of the present invention are accomplished by providing a fungicidal and bactericidal composition consisting essentially of a mixture of tetraalkylthiuram sulfides and water-insoluble metal salts of pentachlorophenol. Surprisingly the fungicidal and bactericidal activity of the composition according to the present invention is considerably greater than the activity of appropriate amounts of tetraalkylthiuram disulfides or metal-pentachlorophenates alone. That is to say, the components of the composition according to the present invention act synergistically to produce a bactericidal and fungicidal effect which is much greater than it was to be foreseen.

Suitable tetraalkylthiuram sulfides which are used as the one component of the bactericidal and fungicidal composion of the present invention are, for example, tetramethylthiuram mono- and disulfide, tetraethylthiuram mono- and disulfide, tetrapropylthiuram mono- and disulfide and bis-pentamethylenethiuram disulfide.

Water-insoluble salts of pentachlorophenol, which are used as the second component of said compositions are, for example, copper-, lead-, cadmium- and zinc-pentachlorophenate. Of the above pentachlorophenates, the cadmium- and zinc-salts are particularly preferred for the reason that they exhibit especially good results when combined with the tetraalkylthiuram sulfides.

The above components can be present in the bactericidal and fungicidal compositions of the present invention in amounts which may vary within wide limits without departing from the scope of the present invention. As an example, which is given only for illustrating and by no way for limiting the scope of the present invention, mixtures wherein the components are present in proportions by weight ranging from about 7:3 to about 3:7, have proved to be useful bactericidal and fungicidal compositions. In most cases, especially good results can be obtained, if the compositions contain equal parts by weight of each of the components.

The compositions can be used either alone or in admixture with other usual materials, e.g. wetting and dispersing agents, carriers, pigments and other ingredients. Especially, they are suitable to impart outstanding fungicidal and bactericidal properties to various organic materials if incorporated therein or otherwise combined therewith. For example, there are obtained plastic materials, coating compositions, formed bodies and coatings with outstanding fungicidal and bactericidal properties, if the said organic materials are combined with as little as between about 0.5 and about 5.0 percent by weight of said compositions. In the case of plastic materials, formed bodies made therefrom, and coatings respectively, there are obtained materials, the fungicidal and bactericidal properties of which are vastly improved over materials which contain only one of the fungicidally active compounds, the total amount of the active compounds being the same in either case. In addition, the persistency period of the fungicidal and bactericidal activity is considerably improved and their sensitiveness towards being washed out is markedly diminished, if the compositions of the present invention are used instead of the components of the said compositions alone.

The fungicidal and bactericidal compositions of the present invention can be incorporated by conventional methods with success into a wide variety of organic materials. As example for plastic materials, there are to be mentioned polyvinyl chloride, cellulose acetate and cellulose aceto butyrate and polymethyl(meth) acrylates.

The resulting plastic materials can be worked into formed bodies, e.g., fibres, foils or moldings, with outstanding properties, especially with respect to their fungicidal and bactericidal activities. Furthermore, the compositions of the present invention, if incorporated into usual coating compositions, likewise impart the same advantageous properties to the coatings obtained therefrom. Suitable coating compositions which yield bactericidal and insecticidal coatings upon admixing with the compositions of the present invention are, for example, binder paints, especially dispersion paints and emulsion paints, based on binders from the group consisting of alkyd resins, polyvinyl acetate, polymethylacrylate, polyvinyl propionate, polyvinylchloride, polystyrene-butadiene latex, chlorinated rubber and polyester-polyurethanes, which are admixed with the bactericidal and fungicidal compositions of the present invention.

The term alkyd resins means that known group of resins which are esterification products of at least one polyhydric aliphatic alcohol and at least one polycarboxylic acid, which are frequently modified by the addition of other saturated or unsaturated mono- or polycarboxylic and mono- or polyhydric compounds or otherwise. Examples of alkyd resins in the meaning of the present invention are the esterification products of o-, m- and p-phthalic acid and glycerol, trimethylol ethane, trimethylol propane and pentaerythritol, which can be modified by the incorporation of fatty acids and fatty alcohols, esters of fatty acids and polyhydric alcohols, saturated or unsaturated aliphatic polycarboxylic acids, mono- and dihydric aliphatic alcohols etc.

Polyester-polyurethanes are, for example, polymeric materials which can be obtained by reacting polyesters with free hydroxyl groups from polyhydric alcohols and polycarboxylic acids, and organic polyisocyanates. Examples of such polyester-polyurethanes are the reaction products of a polyester with free hydroxyl groups from adipic acid, phthalic acid and ethylene glycol, diethylene glycol and trimethylol propane, and the reaction product of 3 mols toluylene diisocyanate and trimethylol propane as the organic isocyanate component.

Besides the above mentioned binders, the dispersion paints and emulsion paints can contain the usual additives, for example, pigments, pigment extenders, stabilizers, wetting agents, emulsifiers, etc.

The bactericidal and fungicidal coating compositions of the present invention can be applied to a multitude of materials, for example, wood, metals, plastics, paper masonry etc., to yield coatings with a long lasting, high fugicidal and bactericidal activity, which is stable towards being washed out by water in an unexpectedly large degree.

To determine the fungicidal activity of the materials, use can be made of the Australian Standard Specification "A new method for assessing the resistance of paint films to fungal growth," Report 219, September 1955, 620,193.82: 667,613. According to this method, sample coatings on paper are placed on an artificial culture medium and inoculated with a spore mixture of *Aspergillus niger, Pullularia, pullulans,* and Alternaria species.

The stability of the activity towards being washed out can be determined by soaking the samples in running water and subsequent biological examination, as indicated above.

In the following experimental results, the dosages of active agents are always referred to the total solids content of the paint or to the total weight of the plastic.

An addition is termed "effective" if the specimen remains completely free from attack by fungus after three weeks. The term "ineffective" is applied to samples which exhibit a more or less intensive attack by fungus after this period.

*Example 1*

Several samples of a polyvinyl acetate dispersion paint pigmented with lithopones, which contained 100 parts by weight of pigments per 50 parts by weight of polyvinyl acetate, were examined for their mould resistant activities after the addition of the active materials given in the following Table 1 according to the above mentioned test method, with and without soaking. Soakings: 24 hours in running water at 30° C.

The following results were obtained:

TABLE 1

| Active material added | Without soaking | With soaking |
|---|---|---|
| Tetramethylthiuram disulphide.[1] | 2.5% ineffective<br>3% effective | 5% ineffective. |
| Zinc pentachlorophenate [1] | 0.4% ineffective<br>0.8% effective | 1.2% ineffective. |
| Mixture of equal parts by weight of tetramethylthiuram disulphide and zinc pentachlorophenate.[1] | 1.05% effective | 1.5% ineffective.<br>2.1% effective. |

[1] Percent by weight.

The results clearly show that the combination has more than additive activity and considerable resistance towards being washed out.

*Example 2*

Several samples of an alkyd resin emulsion paint emulsified with casein and wax, which contained 100 parts by weight of a titanium dioxide pigment per 40 parts by weight of an alkyd resin from glycerol and phthalic acid anhydride with a content of linseed oil of about 60% and an acid value below about 10 were examined for their mould resistant activities after the addition of the active materials given in the following Table 2 according to the above mentioned test method. The soaking takes place in running water for 2 hours at 30° C. The following results were obtained:

TABLE 2

| Active material added: | After soaking |
|---|---|
| tetramethylthiuram disulfide (percent by weight) | 4% ineffective. |
| zinc pentachlorophenate (percent by weight) | 4% ineffective. |
| mixture of equal parts by weight of tetramethylthiuram disulfide and zinc pentachlorophenate (percent by weight) | 2% ineffective, 3.0% effective. |

The results of this test also confirm the synergistic effect of the combination of active agents according to the present invention.

*Example 3*

A foil is prepared from polyvinyl chloride containing 25 percent by weight of a plasticizer consisting of a mixture of the phenyl ester and the cresyl ester of an alkane sulfonic acid with 15 carbon atoms and 2.5 percent by weight of a mixture of equal parts by weight of a tetramethylthiuram disulfide and zinc pentachlorophenate. The sterile surface of the said foil is impregnated with an aqueous dispersion of *Staphylococcus aureus* (about 4 millions of germs per ml.) and stored at 70% relative humidity of the surrounding air at room temperature. The surface of the foil was sterile again after only 16 hours.

If the above test is repeated except that *Candida albicans* is used instead of *Staphylococcus aureus,* the surface of the foil is sterile again after 24 hours.

In contradistinction thereto, with a foil free of bactericidal compounds, which was impregnated as indicated above, the original amount of germs present is not substantially diminished after 16 hours.

We claim:

1. Polymeric structures and coatings having fungicidal and bactericidal surfaces, characterised in that they contain a combination of (A) a compound selected from the group consisting of tetramethylthiuram mono- and disulphide, tetraethylthiuram mono- and disulphide, tetrapropylthiuram mono- and disulphide and bis-pentamethylenethiuram disulphide, and (B) a water-insoluble metal salt of pentachlorophenol selected from the group consisting of copper, lead, cadmium and zinc pentachlorophenate, said combination being in an amount from about 0.05 to about 5 percent by weight.

2. Polymeric structures and coatings according to claim 1, wherein the proportions of the active components in the combination amount from about 7:3 to about 3:7.

3. Coatings according to claim 1, selected from the group consisting of polyvinyl acetaate, polyvinyl chloride, polyvinyl propionate, styrene-butadiene latex, chlorinated rubbers, polyester-polyurethane lacquers and alkyd resins.

4. A combination of (A) a compound selected from the group consisting of tetramethylthiuram mono- and disulphide, tetraethylthiuram mono- and disulphide, tetrapropylthiuram mono- and disulphide and bis-pentamethylenethiuram disulphide, and (B) a water-insoluble metal salt of pentachlorophenol selected from the group consisting of copper, lead, cadmium and zinc pentachlorophenate.

5. A combination according to claim 4 wherein the proportions of the compounds (A) and (B) amount from about 7:3 to about 3:7.

6. Dispersion paints containing a film forming material and a combination of (A) a compound selected from the group consisting of tetramethylthiuram mono- and disulphide, tetraethylthiuram mono- and disulphide, tetrapropylthiuram mono- and disulphide and bispentamethylenethiuram disulphide, and (B) a water-insoluble metal salt of pentachlorophenol selected from the group consisting of copper, lead, cadmium and zinc pentachlorophenate, said combination being in an amount from about 0.05 to about 5 percent by weight related to the body content of said dispersion paints.

References Cited by the Examiner
UNITED STATES PATENTS

| | | |
|---|---|---|
| 2,264,191 | 11/1941 | Starkweather et al. ___260—29.7 |
| 2,476,235 | 7/1949 | Benignus _____ 260—29.7 |
| 2,635,085 | 4/1953 | Gonnard et al. _____ 260—29.7 |
| 3,034,949 | 5/1962 | Byker _____ 167—22 |

MURRAY TILLMAN, *Primary Examiner.*

WILLIAM H. SHORT, *Examiner.*

J. ZIEGLER, *Assistant Examiner.*